United States Patent [19]

Gornall

[11] 4,319,843
[45] Mar. 16, 1982

[54] INTERFEROMETER APPARATUS FOR THE DIRECT MEASUREMENT OF WAVELENGTH AND FREQUENCY

[75] Inventor: William S. Gornall, Fairport, N.Y.

[73] Assignee: Burleigh Instruments, Inc., Fishers, N.Y.

[21] Appl. No.: 124,481

[22] Filed: Feb. 25, 1980

[51] Int. Cl.³ .............................................. G01B 9/02
[52] U.S. Cl. .................................. 356/346; 356/349; 356/363
[58] Field of Search ........................ 356/346, 349, 363

[56] References Cited

U.S. PATENT DOCUMENTS 4,052,129 10/1977 Schawlow et al. ................. 356/349
4,165,183 8/1979 Hall et al. ............................ 356/346

OTHER PUBLICATIONS

Kowalski et al., *Journal of the Optical Society of America*, vol. 66, No. 9, Sep. 1976, pp. 965 and 966.
Kowalski et al., *Journal of the Optical Society of America*, vol. 68, No. 11, Nov. 1978, pp. 1611–1613.
Salimbeni et al., *Optics Letters*, vol. 5, No. 2, Feb. 1980, pp. 39–41.
Rowley, *IEEE Transactions on Instrumentation and Measurement*, vol. IM-15, No. 4, Dec. 1966, pp. 146–149.
Baldwin et al., *Hewlett–Packard Journal*, Dec. 1971, pp. 14–20.
Bukovskii et al., *Pribory i Tekhnika Eksperimenta*, No. 3, May–Jun. 1974, pp. 175–177.
Hall et al., *Applied Physics Letters* vol. 29, 1976, pp. 367–369.

*Primary Examiner*—F. L. Evans
*Attorney, Agent, or Firm*—Martin LuKacher

[57] ABSTRACT

A dual beam interferometer in which the motion of a mirror produces optical path variation resulting in fringes at photodetectors provides direct, selectable measurement of wavelength and frequency of an input laser beam with high accuracy and over a large frequency and wavelength range without the need for correction due to differences in the index of refraction over the range.

8 Claims, 2 Drawing Figures

INTERFEROMETER APPARATUS FOR THE DIRECT MEASUREMENT OF WAVELENGTH AND FREQUENCY

DESCRIPTION

The present invention relates to interferometer apparatus for the direct measurement of wavelength and frequency and particularly to an improved dual beam interferometer of the moving mirror type which utilizes a reference beam, on the basis of the frequency or wavelength of which measurement of the frequency or wavelength of another input beam may be obtained directly in micrometers (microns) and wave number ($cm^{-1}$).

The invention is especially suitable for the measurement of the precise wavelength and frequency of an input beam over a wide range of wavelengths as for example from a dye laser in order that such an input beam may be used in spectroscopy, light wave communication and other purposes.

Devices have been proposed which operate on the principle of the two beam Michelson interferometer in which the motion of a mirror produces an optical path variation in the interfering beams. The interference fringes are detected and the number of fringes detected for an unknown input beam is compared with the number of fringes detected for a reference beam. It is possible from the ratio of the number of fringes to calculate the unknown wavelength of the input beam. Such devices are described in the following articles: F. V. Kowalski, et al., *J. Opt. Soc. Am* 66, 965 (1976) and *J. Opt. Soc. Am.* 68, 1611 (1978) and J. L. Hall, et al., *Appl. Phys. Lett.* 29, 367 (1976). Such devices are primarily laboratory instruments and are difficult to set up and use, their accuracy is subject to errors, particularly when measurements over a wide range (e.g., 0.4 to 4 microns) of wavelength are desired because of variations in index of refraction of air over the wide range of frequencies as well as due to temperature and pressure variations. The known types of interferometer apparatus are also difficult to use because of problems in aligning the reference beam and the unknown input beam with respect to the optical components of the interferometer and also because they do not supply a direct reading of wavelength or frequency of the unknown input beam.

Accordingly, it is an object of the present invention to provide an improved dual beam interferometer apparatus which is convenient to use and provides a direct and selectable readout of wavelength or frequency of an unknown input laser beam.

A further object of the present invention is to provide an improved interferometer instrument for measuring the wavelength or frequency of an unknown laser beam over a wide range of frequencies and wave lengths without significant adjustment or compensation or calculations to accommodate correction factors.

A still further object of the invention is to provide an improved interferometer apparatus using dual beams, one of which is a reference beam and the other is the unknown input beam, wherein the unknown input beam may readily be aligned with respect to the reference beam.

A still further object of the invention is to provide an improved dual beam interferometer apparatus which operates by counting the number of interference fringes in a reference beam and an unknown input beam and which provides a direct readout of frequency or wavelength directly from the apparatus and without the need for any calculations.

Briefly described, apparatus for making interferometic measurements of a input laser beam in accordance with the invention makes use of a reference laser beam. A dual beam moving mirror interferometer has an entrance. The interferometer has a beamsplitter, a reference beam detector, an input beam detector, a pair of conjointly, reciprocally movable folded mirrors and a pair of stationary mirrors which define first and second parallel paths through the beamsplitter along which the reference beam passes in opposite directions through the entrance to the interferometer. The reference beam provides a tracer for alignment of the input beam to pass through the entrance to the interferometer along the same path taken by the reference beam, but in the opposite direction thereto. This enables the apparatus to be readily set up for use. The beamsplitter and the movable, folded mirrors also provide optical paths of varying lengths along which the reference and input beam pass to their respective detectors. These detectors and their associated electronics provide first and second trains of pulses when interference fringes are produced at the detectors while the folded mirrors move. The number of these pulses in each train are translated into an output which directly represents the wavelength or frequency of the input beam.

In accordance with an embodiment of the invention this translation may be accomplished by means of a down counter which is preset exactly to a number corresponding to the frequency or wavelength of the reference beam. When wavelength is to be measured the number corresponds to the wavelength of the reference beam, and when frequency is to be measured the number corresponds to the frequency of the reference beam. The preset counter inhibits the other counter when it counts exactly the number of pulses preset therein. The number registered in the other counter is a direct representation of the wavelength or frequency of the unknown input beam. The number may be displayed to provide the operator of the instrument with the wavelength or frequency reading without further calculation. The interferometer is configured to be located within a vacuum chamber such that index of refraction variations with wavelength and temperature, pressure and other ambient conditions do not affect the precision of the instrument.

The foregoing and other features, objects and advantages of the invention as well as a presently preferred embodiment thereof will become more apparent from a reading of the following description in connection with the accompanying drawings in which.

Figure 1:
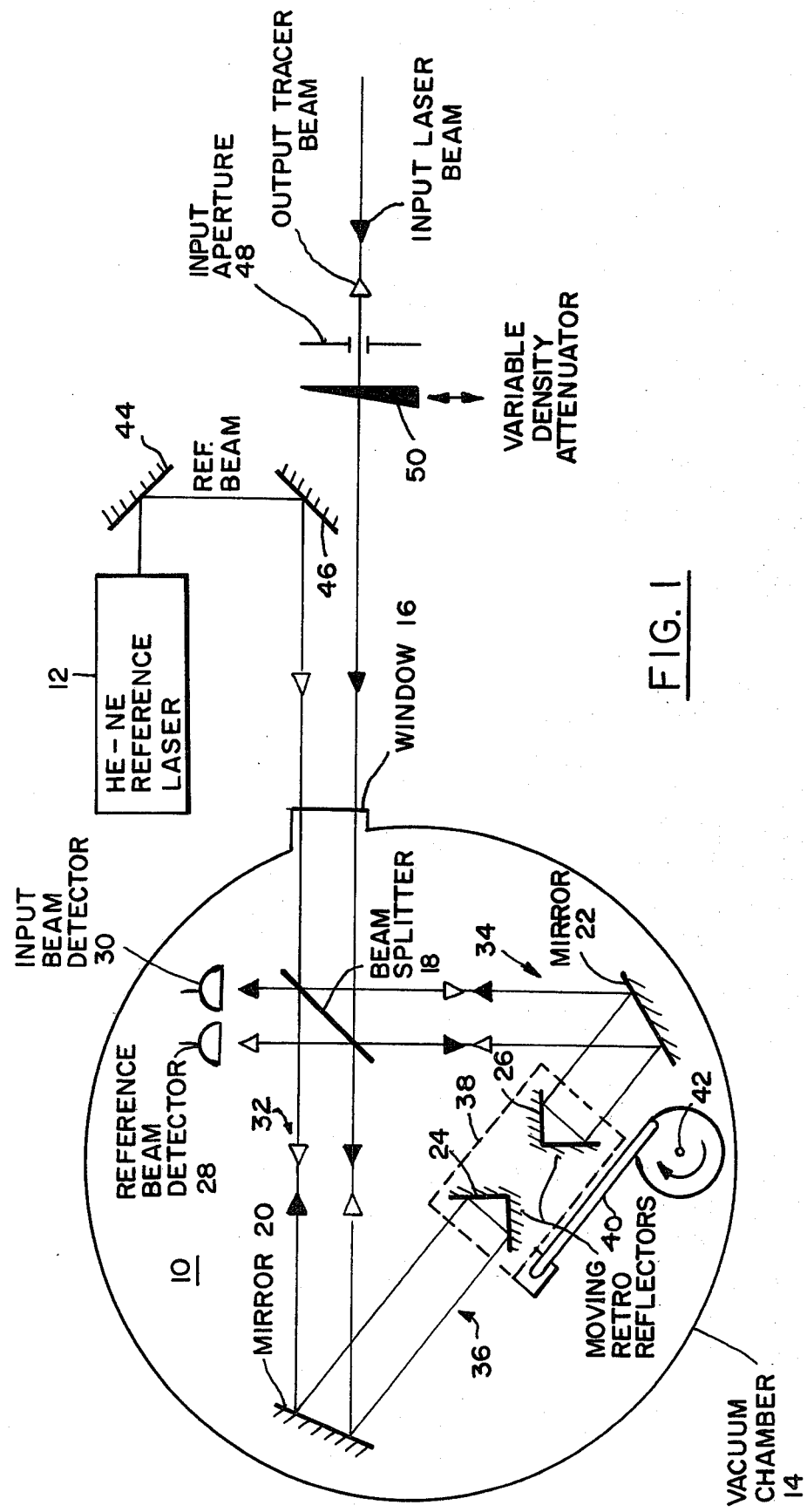
FIG. 1 is a schematic representation of interferometer apparatus in accordance with the presently preferred embodiment of the invention.

Referring more particularly to FIG. 1 there is shown a dual beam moving mirror interferometer 10 of the Michelson type. A reference laser 12, which in this example is a helium neon (He-Ne) laser provides the reference beam. The wavelength of this beam in vacuum is precisely known, as is its frequency. The helium neon wavelength with an accuracy in one part in a million is 0.632991 microns. Its frequency is 15,798.00 $cm^{-1}$. The unknown input laser beam which is to be measured in wavelength and/or frequency by the apparatus is obtained from another laser such as a dye laser. The helium neon reference laser is mounted on the same chassis as the interferometer and is part of the instrument. The unknown input laser beam must be coupled and aligned precisely with the interferometer 10. The invention provides a convenient means for such alignment in that the reference beam is visible and provides an output tracer beam with which the input laser beam may be aligned as will be described more fully hereinafter.

The interferometer 10 is mounted within a vacuum chamber 14. A window 16 of the vacuum chamber provides the entrance to the interferometer 10. The compactness of the interferometer makes the vacuum enclosure thereof in the vacuum chamber 14 feasible. In as much as the index of refraction in vacuum is the same over a wide band of wavelengths, such as wavelengths from 0.4 to 4 microns, which may be the wavelength of unknown input laser beams, the use of the vacuum chamber 14 enables the maintenance of the precision of the measurement over a broad wavelength range.

The interferometer contains a beamsplitter 18, a pair of stationary mirrors 20 and 22 and a pair of conjointly reciprocally, movable, folded mirrors 24 and 26. These mirrors 24 and 26 are preferably corner cube retroreflectors. There are two photodetectors 28 and 30, such as photodiodes, which detect the interference fringes in the reference beam and in the input beam, respectively. The stationary mirrors 20 and 22 and the beamsplitter 18 define three arms 32, 34 and 36 along which the dual input and reference beams pass in the interferometer. The arms 32 and 34 which converge at the beamsplitter 18 are perpendicular to each other. The arm 36 makes 45° internal angles to the arms 32 and 34. This affords the compact structure enabling the interferometer to be enclosed in the vacuum chamber 14 and also provides paths of equal length along which the reference and input beams pass to the detectors 28 and 30 in the interferometer. These long paths enable accurate measurement of the wavelength and frequency of laser beams having long coherence lengths.

The paths for the reference beam are indicated by the hollow arrows while the input beam paths are indicated by the arrows which are filled in. The beamsplitter is at an angle of 45° to these paths, and the plane of the beamsplitter bisects the arm 36 of the interferometer 10. The moving folded mirrors 24 and 26, in their center position, are symmetrically disposed about this bisector and are at equal distances therefrom. This congruent relationship also lends itself to measurement of short coherence length beams. The beams are shown parallel to each other in a horizontal plane for ease of illustration of the invention. It will be appreciated that the beams may be vertically arranged one above the other. The mirrors 24 and 26 are mounted on a carriage 38 which is linearly reciprocated along the arm 36 by a crank mechanism 40. The crank may be driven continuously by a motor, the shaft 42 of which extends into the vacuum chamber 14.

The reference beam from the helium neon laser 12 is reflected in the entrance window 16 by stationary mirrors 44 and 46. The reference beam is split into two parts, one of which passes into the arm 32 and is reflected by the stationary mirror 20 and the folded mirror 24 so as to pass along a parallel path again through the beamsplitter 18 through an input aperture 48 of the instrument where it serves as the output tracer beam.

The input laser may readily be aligned to be coincident with the output tracer beam so that it passes into the instrument through the input aperture along the same path as the reference beam but in the opposite direction thereto. This arrangement makes the alignment of the instrument both convenient and easy to accomplish. A variable density attenuator 50 may be used to adjust the amplitude of the input beam.

The reference beam, as it returns through the beamsplitter 18, is split and directed to the reference beam detector 28. The reference beam, as it passes through the entrance window 16, is also split by the beamsplitter 18 and reflected by the stationary mirror 22 and the folded mirror 26 along parallel paths. The reference beam passes in opposite direction along these paths in the arm 34. The return path which is on the inside of the arm passes through the beamsplitter to the reference beam detector 28. The input beam is also split by the beamsplitter 18 and passes in opposite directions along the paths in the arms 32, 34 and 36 to the input beam detector 30. As the moving folded mirrors reciprocate, one of the reference beam paths lengthens while the other shortens. The same is true for the input beam paths. This optical path variation results in interference fringes which are detected by the detectors 28 and 30 and provided as signals therefrom. The number of the fringes and of the signals provides information from which the wavelength and frequency of the beam may be determined.

Figure 2:
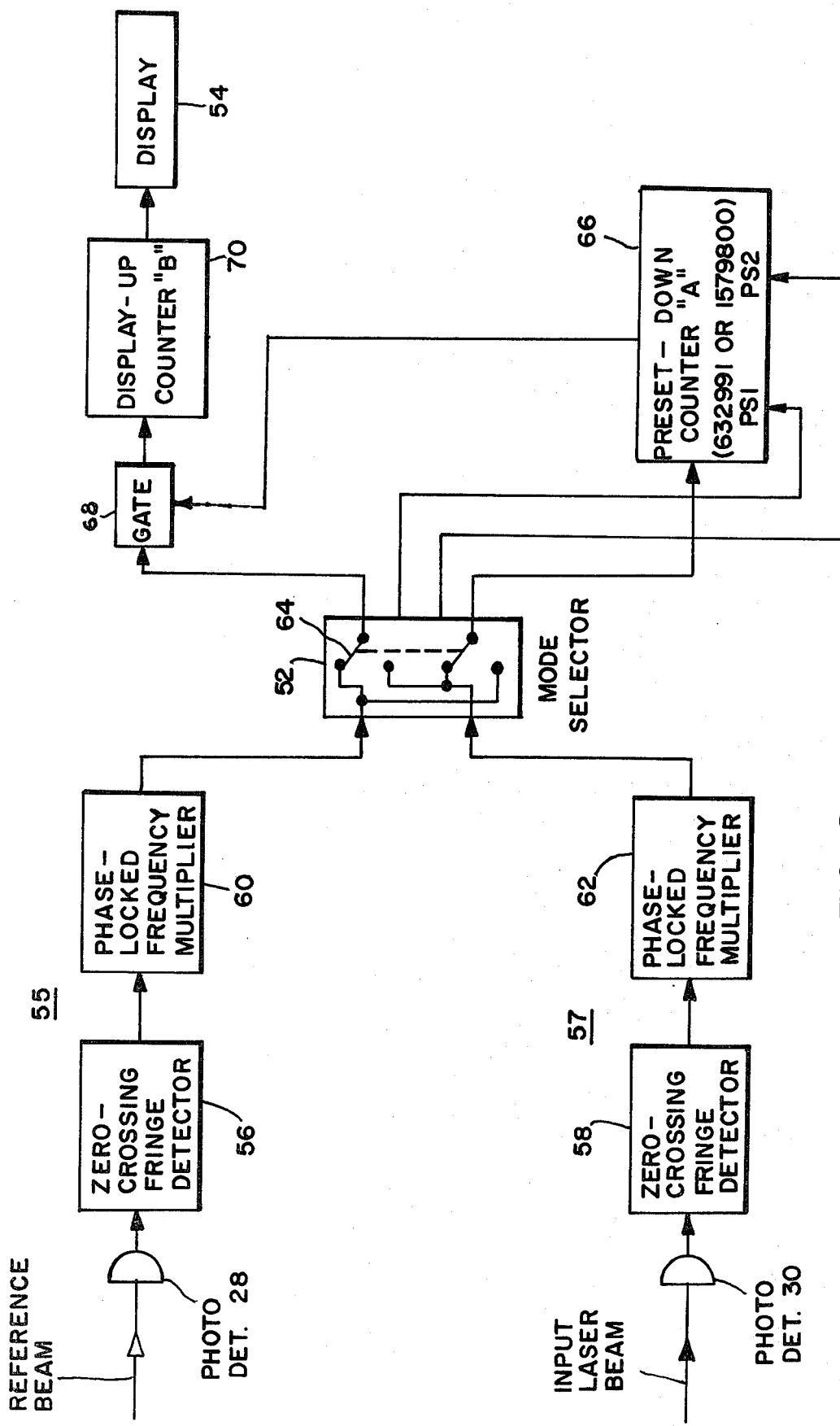
FIG. 2 is a block diagram illustrating the electronics which form part of and are used with the apparatus illustrated in FIG. 1.

Electronics shown in FIG. 2 provides direct measurement of wavelength and frequency. The wavelength or frequency, as selected by a mode selector 52, is read out and displayed directly in microns or wavenumber ($cm^{-1}$) on a display 54. The display 54 may suitably be a seven digit LED display.

The reference beam signals from the photodetector 28 are processed in a reference channel 55, while input beam signals from the other photodetector 30 are processed in an input channel 57. The signal corresponding to the fringes are converted into pulses by zero crossing fringe detectors 56 and 58 in each channel. These may be operational amplifiers, biased to operate as comparators to produce a transition in level when the signals thereto cross a reference level (which is suitably zero or ground level). Each transition thereby produces a pulse. The frequency of the pulses is multiplied, suitably sixteen times, by phase lock frequency multipliers 60 and 62. These may include phase detectors, voltage control oscillators and dividers in a loop. The voltage control oscillators may have course and fine adjustments so as to bring them within locking range of the pulse signal frequency, which varies depending upon the wavelength and frequency of the beams being measured. The mode selector 52 is effectively a double pole double throw switch 64 and command signal generator which outputs command levels selectively to the PS1 or PS2 input of a preset down counter 66 (counter "A" in the drawing). The counter 66 outputs an inhibiting level to a gate 68 when it counts down to zero. The gate passes pulse signals either from the reference beam channel 55 or the input laser beam channel 57, depending upon whether the wavelength or frequency modes are selected. These pulses are counted in a up counter 70 (counter "B" in the drawing) which serves as a display counter and drives the display 54.

The preset down counter 66 is preset to count down from a number which is identically equal to the wavelength of the reference beam times a decimal scale factor, when wavelength of the input is to be measured. This occurs when the mode selector applies a command signal to the PS1 input of the counter. When frequency is to be directly read out and displayed the mode selector command signal is applied to the PS2 input of the down counter 66 and presets that counter to the frequency of the reference beam, again times a decimal scale factor. The wavelength preset in this exemplary embodiment where a helium neon laser is used, is 632,991 for the wave length measurement mode and 1,579,800 for the frequency measuring mode. The wavelength measurement in the wavelength mode is determined by the following equation:

$$\lambda = \frac{M_o N_o}{MN} \lambda_o$$

For the frequency mode the governing equation is:

$$f = \frac{MN}{M_o N_o} f_o$$

In these equations $\tau_o$ is a vacuum wavelength of the reference laser, $f_o$ is the vacuum frequency of the reference laser, $\tau$ is the vacuum frequency of the input laser, f is the vacuum frequency of the input laser, $N_o$ is the number of interference fringes of the reference laser beam scanned by the reference beam photodetector 28, N is the number of interference fringes of the input laser beam scanned by the input beam photodetector 30, $M_o$ is the reference channel 55 frequency multiplier 60 multiplication factor (16 in this example) and M is the input beam channel 57 frequency multiplier 62 multiplication factor, which in this example is also 16.

Consider that in the wavelength mode, the down counter 66 is preset to the reference wavelength in microns 0.632991 times a scale factor. In the equation MN is equal to the reference wavelength. The number $M_o N_o$ directly corresponds to the wavelength of the input laser. With the mode selector set with the switch 64 as shown in FIG. 2, the up counter 70 counts $M_o N_o$, while the preset down counter counts MN. When MN is counted and the down counter decrements to zero, the gate 68 is inhibited and the count $M_o N_o$ in the up counter 70 is identically equal to the wavelength of the input laser times the scale factor. Since the scale factor is $10^6$ the decimal placement in the display to the left of the second digit will read out wavelength directly in microns. The operation is similar for the frequency measurement mode. There the input laser beam channel 57 is connected to the gate 68 and MN is accounted and registered in the up counter 70 while the reference channel 55 is connected to the preset down counter 66. When $N_o M_o$ equals the frequency of the reference beam; 1,579,800 counts having been registered. The down counter 66 decrements to zero and the input to the up counter 70 is inhibited and the count MN stored therein is identical to the frequency of the input beam. By placement of the decimal point on the display this frequency can be read out in MHz. Accordingly, the instrument is extremely easy to use and provides a direct read out without the need for further calculations or provisions for correction factors.

It may be desirable in some applications, especially where longer wavelengths may be measured that the multipliers M&$M_o$ be different, then the preset number is changed by a factor equal to the ratio or inverse ratio of M to $M_o$ to provide the reading directly in microns or $cm^{-1}$.

From the foregoing description it will be apparent that there has been provided improved interferometer apparatus which is easily and conveniently used for the measurement of wavelength or frequency of an unknown input reference beam. Variations and modifications in the herein described apparatus will undoubtedly suggest themselves to those skilled in the art. Accordingly the foregoing description should be taken as an illustrative and not in a limiting sense.

I claim:

1. Apparatus for making interferometic measurements of an input laser beam through the use of a reference laser beam which comprises a dual beam moving mirror interferometer having an entrance, a beamsplitter, a reference beam detector, an input beam detector, a pair of conjointly reciprocally movable folded mirrors and a pair of stationary mirrors which define first and second parallel paths through said beamsplitter along which said reference beam passes in opposite directions through said entrance to provide a tracer beam for alignment of said input beam to pass through said entrance into said interferometer along said second path in the opposite direction to said reference beam, said beamsplitter and said movable folded mirrors also defining third and fourth paths of varying lengths along which said reference beam passes to said reference beam detector and along which said input beam passes to said input beam detector respectively, means connected to said reference beam detector and to said input beam detector for respectively providing first and second trains of pulses when interference fringes are produced at said detectors while said folded mirrors reciprocate, and means for translating the numbers of pulses in said first and second trains into an output directly representing the wavelength or frequency of said input beam.

2. The apparatus as set forth in claim 1 further comprising a vacuum chamber, said interferometer being disposed in said chamber.

3. The apparatus as set forth in claim 2 wherein said beamsplitter and said stationary mirrors define three arms of said third and fourth paths terminating at said beamsplitter and said stationary mirrors, first and second of said three arms which terminate at said beamsplitter being perpendicular to each other, the third of said three arms between said stationary mirrors being disposed at internal angles of 45° to said first and second arms at the opposite ends thereof.

4. The apparatus as set forth in claim 3 further comprising a carriage reciprocally movable linearly along said third arm, said folded mirrors each being a corner reflector and being mounted on said carriage with the reflecting surfaces thereof facing in opposite directions toward different ones of said stationary mirrors.

5. The apparatus as set forth in claim 1 wherein said translating means comprises first and second counters, means for presetting said counters to count a number of said pulses which correspond to the wavelength of said reference beam, means for applying said second pulse trains to the first counter and, until said preset number of pulses is counted therein, for applying said first pulse train to said second counter to obtain a count in second counter directly correspondent to the wavelength of said input beam.

6. The apparatus as set forth in claim 1 wherein in said translating means comprising first and second counters, means for presetting the first of said counters to count the number of pulses which correspond to the frequency of said reference beam, means for applying said first pulse train to said first counter and, until said preset number of pulses is counted therein, for applying said second pulse train to said second counter to obtain a count directly corresponding to the frequency of said input beam in said second counter.

7. The apparatus as set forth in claims 5 or 6 wherein said number to which said first counter is set is equal to the product of said wavelength or frequency of said reference beam, or a multiple or submultiple thereof, and a power of 10.

8. The apparatus as set forth in claims 5 or 6 further comprising means for displaying the count registered in said second counter.

* * * * *